US012401139B2

(12) United States Patent
Wu et al.

(10) Patent No.: US 12,401,139 B2
(45) Date of Patent: Aug. 26, 2025

(54) COMMUNICATION DEVICE AND COMMUNICATION METHOD

(71) Applicant: HTC Corporation, Taoyuan (TW)

(72) Inventors: Chun-Yih Wu, Taoyuan (TW); Ta-Chun Pu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 130 days.

(21) Appl. No.: 18/394,055

(22) Filed: Dec. 22, 2023

(65) Prior Publication Data

US 2025/0174904 A1 May 29, 2025

(30) Foreign Application Priority Data

Nov. 27, 2023 (TW) ................................ 112145794

(51) Int. Cl.
*H01Q 23/00* (2006.01)
*H01Q 1/26* (2006.01)
*H01Q 15/00* (2006.01)

(52) U.S. Cl.
CPC ............... *H01Q 23/00* (2013.01); *H01Q 1/26* (2013.01); *H01Q 15/0013* (2013.01); *H01Q 15/006* (2013.01)

(58) Field of Classification Search
CPC ............ H01Q 1/26; H01Q 1/44; H01Q 13/26; H01Q 13/28; H01Q 15/0013; H01Q 21/0031; H01Q 21/064; H01Q 21/08; H01Q 23/00; H03F 3/54; H03F 3/58
See application file for complete search history.

(56) References Cited

PUBLICATIONS

Das et al., "Gain enhancement of dual-band terahertz antenna using reflection-based frequency selective surfaces", Optical and Quantum Electronics, vol. 54, No. 161, published on Feb. 14, 2022, pp. 1-23.

*Primary Examiner* — Robert Karacsony
(74) *Attorney, Agent, or Firm* — Birch, Stewart, Kolasch & Birch, LLP

(57) ABSTRACT

A communication device includes a first FSS (Frequency Selective Surface) element, a second FSS element, a feeding radiation element, a first electron gun, and a first electron collector. The second FFS element is adjacent to the first FSS element. The feeding radiation element generates an electromagnetic signal. The electromagnetic signal is propagated by using the first FSS element and the second FSS element. The first electron gun transmits a first electron beam. The first electron collector receives the first electron beam. An antenna structure is formed by the first FSS element, the second FSS element, and the feeding radiation element. A coupling effect is induced between the first electron beam and the electromagnetic signal, such that the radiation energy of the electromagnetic signal is enhanced.

20 Claims, 4 Drawing Sheets

COMMUNICATION DEVICE AND COMMUNICATION METHOD

CROSS REFERENCE TO RELATED APPLICATIONS

This application claims priority of Taiwan Patent Application No. 112145794 filed on Nov. 27, 2023, the entirety of which is incorporated by reference herein.

BACKGROUND OF THE INVENTION

Field of the Invention

The invention relates to a communication device, and more particularly, to a communication device with high radiation gain.

Description of the Related Art

In the NTN (Non-Terrestrial Networks) architecture of 5G and 6G, satellites and high-altitude platform systems are important components that compensate for conventional terrestrial mobile networks. Satellites in GSO (Geosynchronous Orbit) maintain fixed positions above the Earth, and they are mainly used for broadcasting and fixed communications. MEO (Medium Earth Orbit) satellites, such as those used for GPS (Global Positioning System) and Galileo, are located at intermediate orbital altitudes. LEO (Low Earth Orbit) satellites, such as the Starlink system of SpaceX, provide high-speed communications over short distances with shorter delay. In addition, although HAPS (High Altitude Platform Stations) are not satellites, they fill the gap in communication coverage between the ground and satellites, and are used as communication platforms flying in the atmosphere. A common feature, regardless of whether it is GSO, MEO, LEO satellites or HAPS, is the requirement for communication across long distances. Such long-distance communication requires amplifiers with high power and high efficiency, so as to ensure good signal strength and signal quality. SSPA (Solid State Power Amplifier) and TWTA (Traveling Wave Tube Amplifier) are two types of amplifiers that are commonly used in the applications described above. SSPA is characterized by its solid-state design. TWTA is characterized by its high power output. As more communications are requested, the performance and efficiency of these amplifiers can become important issues of research and development efforts.

In addition, array antennas, also known as phased array antennas, are particularly useful for satellites and HAPS communications because of their ability to electronically scan and form directional beams. The design of these antennas allows users to quickly and flexibly adjust their beam direction in response to dynamic communication environments and other requirements.

Therefore, the further optimization of high-performance SSPA and TWTA, as well as the integration and development of array antennas, will become essential issues of non-terrestrial networks in the future.

BRIEF SUMMARY OF THE INVENTION

In an exemplary embodiment, the invention is directed to a communication device that includes a first FSS (Frequency Selective Surface) element, a second FSS element, a feeding radiation element, a first electron gun, and a first electron collector. The second FFS element is disposed adjacent to the first FSS element. The feeding radiation element generates an electromagnetic signal. The electromagnetic signal is propagated by using the first FSS element and the second FSS element. The first electron gun transmits a first electron beam. The first electron collector receives the first electron beam. An antenna structure is formed by the first FSS element, the second FSS element, and the feeding radiation element. A coupling effect is induced between the first electron beam and the electromagnetic signal, such that the radiation energy of the electromagnetic signal is enhanced.

In some embodiments, the first FSS element is configured to partially reflect and partially transmit the electromagnetic signal.

In some embodiments, the second FSS element is configured to completely reflect the electromagnetic signal.

In some embodiments, the second FSS element is made of an AMC (Artificial Magnetic Conductor) material.

In some embodiments, the second FSS element is made of a metal material.

In some embodiments, the feeding radiation element is implemented with a patch antenna.

In some embodiments, the antenna structure covers an operational frequency band from 60 GHz to 500 GHz.

In some embodiments, the specific distance between the first FSS element and the second FSS element is substantially equal to 0.25 wavelength or 0.5 wavelength of the operational frequency band.

In some embodiments, the communication device further includes a first multi-beam aperture board disposed between the first electron gun and the first electron collector. The first multi-beam aperture board is configured to divide the first electron beam into a plurality of first small beams.

In some embodiments, the communication device further includes a second electron gun and a second electron collector. The second electron gun transmits a second electron beam. The second electron collector receives the second electron beam. Another coupling effect is induced between the second electron beam and the electromagnetic signal, such that the radiation energy of the electromagnetic signal is further enhanced.

In some embodiments, the transmission direction of the second electron beam is different from the transmission direction of the first electron beam.

In some embodiments, the communication device further includes a second multi-beam aperture board disposed between the second electron gun and the second electron collector. The second multi-beam aperture board is configured to divide the second electron beam into a plurality of second small beams.

In some embodiments, each of the first multi-beam aperture board and the second multi-beam aperture board is implemented with a silicon photonic substrate.

In another exemplary embodiment, the invention is directed to a communication method that includes the following steps. an electromagnetic signal is generated by a feeding radiation element. A first FSS (Frequency Selective Surface) element and a second FSS element propagate the electromagnetic wave. The second FSS element is disposed adjacent to the first FSS element. The antenna structure is formed by the first FSS element, the second FSS element, and the feeding radiation element. A first electron beam is transmitted by a first electron gun. The first electron beam is received by a first electron collector. A coupling effect is induced between the first electron beam and the electromagnetic signal, which enhances the radiation energy of the electromagnetic signal.

In some embodiments, the communication method further includes using a first multi-beam aperture board to divide the first electron beam into a plurality of first small beams. The first multi-beam aperture board is disposed between the first electron gun and the first electron collector.

In some embodiments, the communication method further includes: transmitting a second electron beam by a second electron gun, and receiving the second electron beam by a second electron collector. Another coupling effect is induced between the second electron beam and the electromagnetic signal, such that the radiation energy of the electromagnetic signal is further enhanced.

In some embodiments, the communication method further includes: dividing the second electron beam into a plurality of second small beams by a second multi-beam aperture board. The second multi-beam aperture board is disposed between the second electron gun and the second electron collector.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
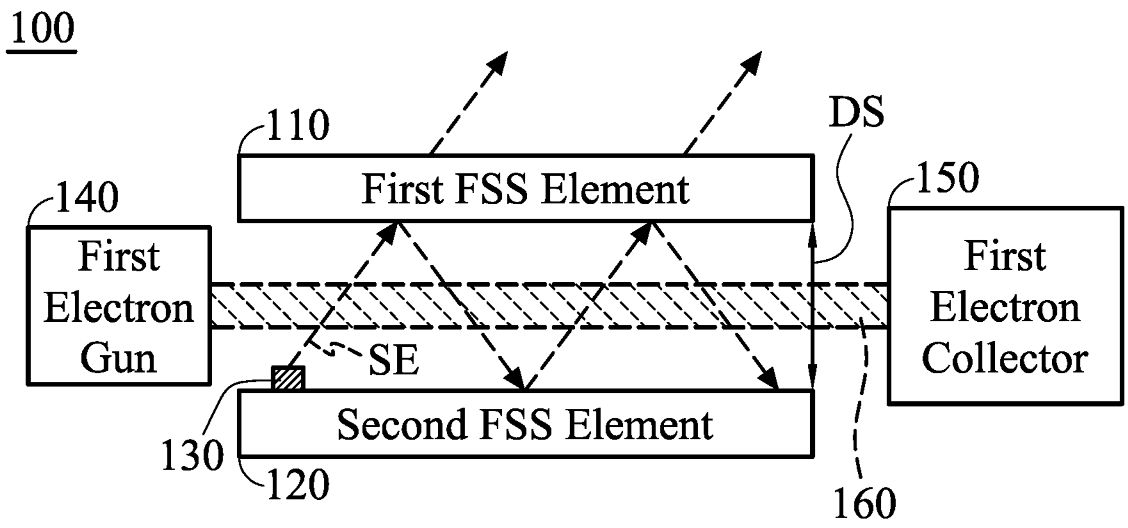
FIG. 1 is a diagram of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. For example, the communication device 100 may be a wireless access point, a wearable device, a smart phone, a tablet computer, or a notebook computer. Alternatively, the communication device 100 may be any unit operating within the Internet of Things (IoT), but it is not limited thereto.

In the embodiment of FIG. 1, the communication device 100 includes a first FSS (Frequency Selective Surface) element 110, a second FSS element 120, a feeding radiation element 130, a first electron gun 140, and a first electron collector 150. It should be understood that the communication device 100 may further include other components, such as a processor, a touch panel, a speaker, and/or a housing, although they are not displayed in FIG. 1.

The second FSS element 120 is disposed adjacent to the first FSS element 110. The first FSS element 110 and the second FSS element 120 may be substantially parallel to each other. For example, the first FSS element 110 may be a PRS (Partially Reflective Surface) element. The second FSS element 120 may be made of an AMC (Artificial Magnetic Conductor) material. Alternative, the second FSS element 120 may be made of a metal material. It should be noted that the term "adjacent" or "close" over the disclosure means that the distance (spacing) between two corresponding elements is shorter than a predetermined distance (e.g., 10 mm or shorter), but often does not mean that the two corresponding elements are touching each other directly (i.e., the aforementioned distance/spacing therebetween is reduced to 0).

The feeding radiation element 130 is configured to generate an electromagnetic signal SE. Also, the feeding radiation element 130 may be coupled to a signal source (not shown). The shapes and types of the feeding radiation element 130 are not limited in the invention. For example, the feeding radiation element 130 may be implemented with a patch antenna, a monopole antenna, a dipole antenna, a loop antenna, or a PIFA (Planar Inverted F Antenna).

The electromagnetic signal SE is propagated by using the first FSS element 110 and the second FSS element 120. For example, the first FSS element 110 may be configured to partially reflect and partially transmit the electromagnetic signal SE, and the second FSS element 120 may be configured to completely reflect the electromagnetic signal SE. In a preferred embodiment, an antenna structure of the communication device 100 is formed by the first FSS element

110, the second FSS element 120, and the feeding radiation element 130. The antenna structure of the communication device 100 can provide relatively high radiation gain because the electromagnetic signal SE results in constructive interference around the first FSS element 110.

In some embodiments, the antenna structure of the communication device 100 covers an operational frequency band from 60 GHz to 500 GHz, so as to support the wideband operations of mmWave (Millimeter Wave). However, the invention is not limited thereto. In alternative embodiments, the antenna structure of the communication device 100 can also support the wideband operations of THz (Terahertz).

In order to enhance the aforementioned constructive interference, the specific distance DS between the first FSS element 110 and the second FSS element 120 can be appropriately designed. For example, if the second FSS element 120 is made of the AMC material, the specific distance DS may be substantially equal to 0.25 wavelength (λ/4) of the operational frequency band of the antenna structure of the communication device 100. Alternatively, if the second FSS element 120 is made of the metal material, the specific distance DS may be substantially equal to 0.5 wavelength (λ/2) of the operational frequency band of the antenna structure of the communication device 100. In some embodiments, each of the first FSS element 110 and the second FSS element 120 is implemented with a multi-layer structure. In some embodiments, the length of each of the first FSS element 110 and the second FSS element 120 is longer than or equal to 10 wavelengths (10λ) of the operational frequency band of the antenna structure of the communication device 100. In some embodiments, the width of each of the first FSS element 110 and the second FSS element 120 is longer than or equal to 10 wavelengths (10λ) of the operational frequency band of the antenna structure of the communication device 100. In addition, the aforementioned specific distance DS may be substantially equal to 0.1 wavelength (λ/10) of the operational frequency band of the antenna structure of the communication device 100.

The first electron gun 140 is configured to transmit a first electron beam 160. The first electron collector 150 is configured to receive the first electron beam 160. In some embodiments, the transmission direction of the first electron beam 160 is substantially parallel to both of the first FSS element 110 and the second FSS element 120, but it is not limited thereto. It should be noted that the first electron beam 160 appears between the first FSS element 110 and the second FSS element 120, and the first electron beam 160 interacts with the electromagnetic signal SE. Generally, a coupling effect is induced between the first electron beam 160 and the electromagnetic signal SE, such that the radiation energy of the electromagnetic signal SE is enhanced. With such a design, the radiation gain of the antenna structure of the communication device 100 can be significantly increased since partial energy of the first electron beam 160 is transferred to the electromagnetic signal SE and it is used to compensate for the propagation attenuation of the electromagnetic signal SE.

Figure 2:
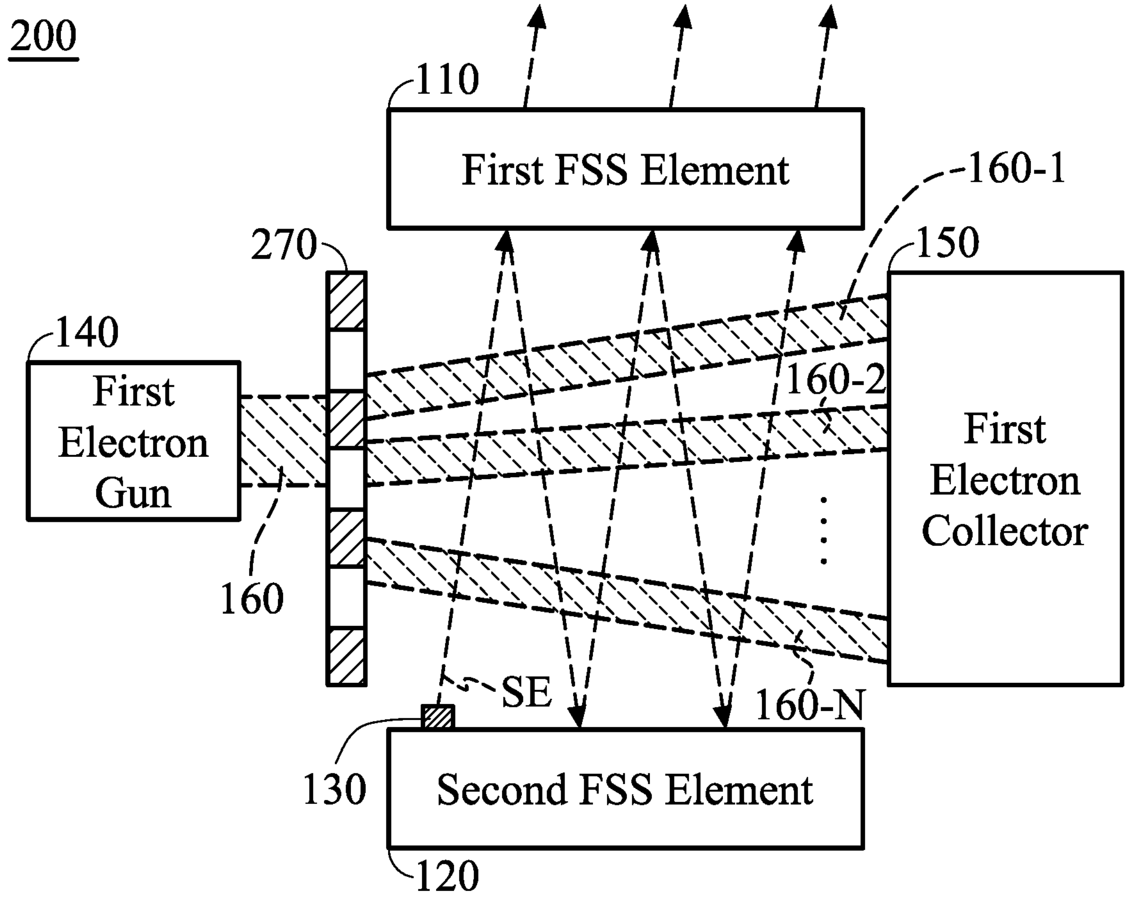
FIG. 2 is a diagram of a communication device according to an embodiment of the invention.

The following embodiments will introduce different configurations and detail structural features of the communication device 100. It should be understood that these figures and descriptions are merely exemplary, rather than limitations of the invention. FIG. 2 is a diagram of a communication device 200 according to an embodiment of the invention. FIG. 2 is similar to FIG. 1. In the embodiment of FIG. 2, the communication device 200 further includes a first multi-beam aperture board 270. The first multi-beam aperture board 270 is disposed between the first electron gun 140 and the first electron collector 150. The first multi-beam aperture board 270 is configured to divide the first electron beam 160 into a plurality of first small beams 160-1, 160-2, . . . , and 160-N, where "N" is any positive integer greater than or equal to 2. For example, the first multi-beam aperture board 270 may have N openings, and the diameter of each opening may be smaller than or equal to 100 μm, but it is not limited thereto.

The first small beams 160-1, 160-2, . . . , and 160-N may have different transmission directions. For example, an angle between the transmission directions of any two adjacent beams selected among the first small beams 160-1, 160-2, . . . , and 160-N may be from 0 to 60 degrees, but it is not limited thereto. According to practical measurements, the first small beams 160-1, 160-2, . . . , and 160-N can enhance the radiation energy of the electromagnetic signal SE in a variety of directions. Other features of the communication device 200 of FIG. 2 are similar to those of the communication device 100 of FIG. 1. Thus, the two embodiments can achieve similar levels of performance.

Figure 3:
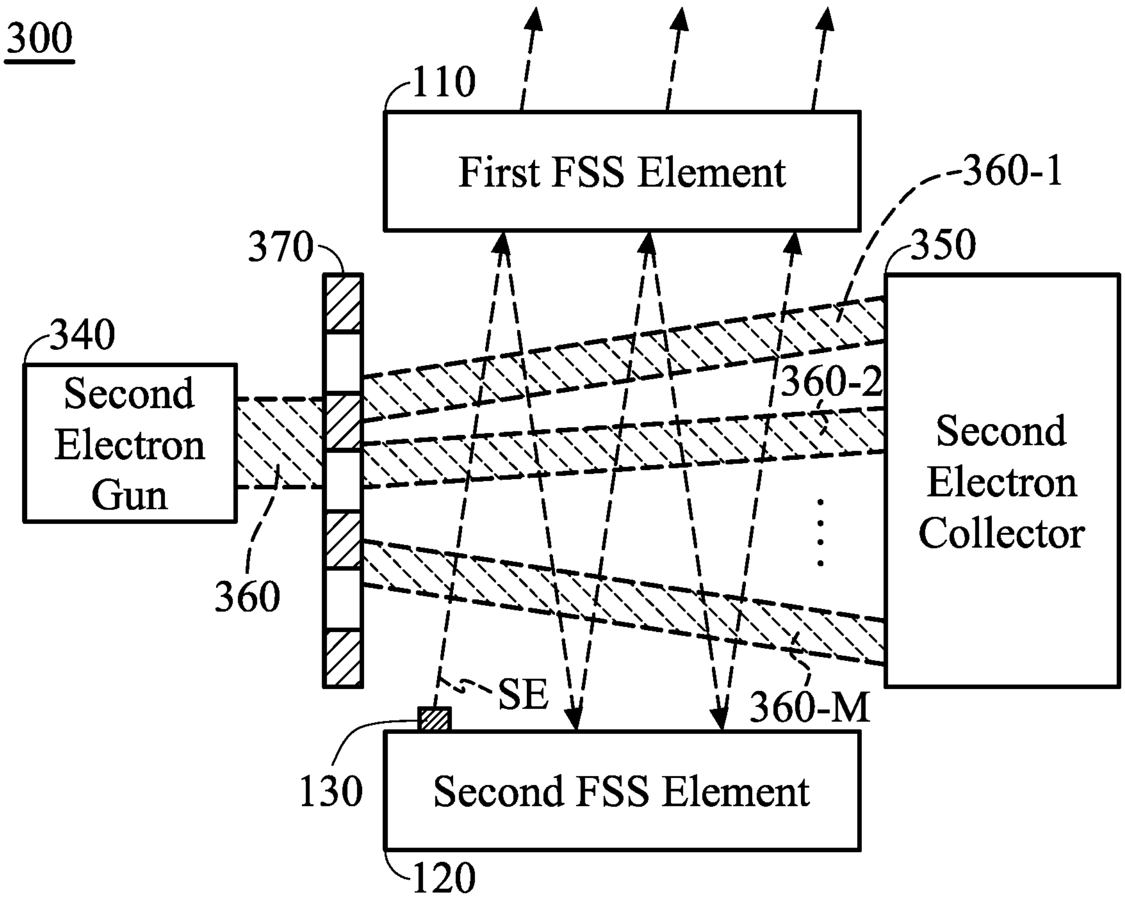
FIG. 3 is a diagram of a communication device according to an embodiment of the invention.

FIG. 3 is a diagram of a communication device 300 according to an embodiment of the invention. FIG. 3 is similar to FIG. 1. In the embodiment of FIG. 3, besides the first electron gun 140 and the first electron collector 150 as mentioned above (not shown), the communication device 300 further includes a second electron gun 340, a second electron collector 350, and a second multi-beam aperture board 370. The second electron gun 340 is configured to transmit a second electron beam 360. The second electron collector 350 is configured to receive the second electron beam 360. In some embodiments, the transmission direction of the second electron beam 360 is substantially parallel to both of the first FSS element 110 and the second FSS element 120. However, the transmission direction of the second electron beam 360 is different from that of the first electron beam 160. Similarly, the second electron beam 360 appears between the first FSS element 110 and the second FSS element 120, and the second electron beam 360 interacts with the electromagnetic signal SE. Generally, another coupling effect is induced between the second electron beam 360 and the electromagnetic signal SE, such that the radiation energy of the electromagnetic signal SE is further enhanced. In addition, the second multi-beam aperture board 370 is disposed between the second electron gun 340 and the second electron collector 350. The second multi-beam aperture board 370 is configured to divide the second electron beam 360 into a plurality of second small beams 360-1, 360-2, . . . , and 360-M, where "M" is any positive integer greater than or equal to 2. The second small beams 360-1, 360-2, . . . , and 360-M may have different transmission directions. For example, another angle between the transmission directions of any two adjacent beams selected among the second small beams 360-1, 360-2, . . . , and 360-M may be from 0 to 60 degrees, but it is not limited thereto. According to practical measurements, the second small beams 360-1, 360-2, . . . , and 360-M can enhance the radiation energy of the electromagnetic signal SE in a variety of directions. It should understood that the second multi-beam aperture board 370 is merely an optional element, which is omitted in other embodiments. Other features of the communication device 300 of FIG. 3 are similar to those of the communication device 100 of FIG. 1. Thus, the two embodiments can achieve similar levels of performance.

In some embodiments, each of the first multi-beam aperture board 270 and the second multi-beam aperture board 370 is implemented with a silicon photonic substrate. In alternative embodiments, each of the first multi-beam aperture board 270 and the second multi-beam aperture board 370 is implemented with an electromagnetic lens, a micro-structure array, or an electronic grating, but it is not limited thereto.

Figure 4:
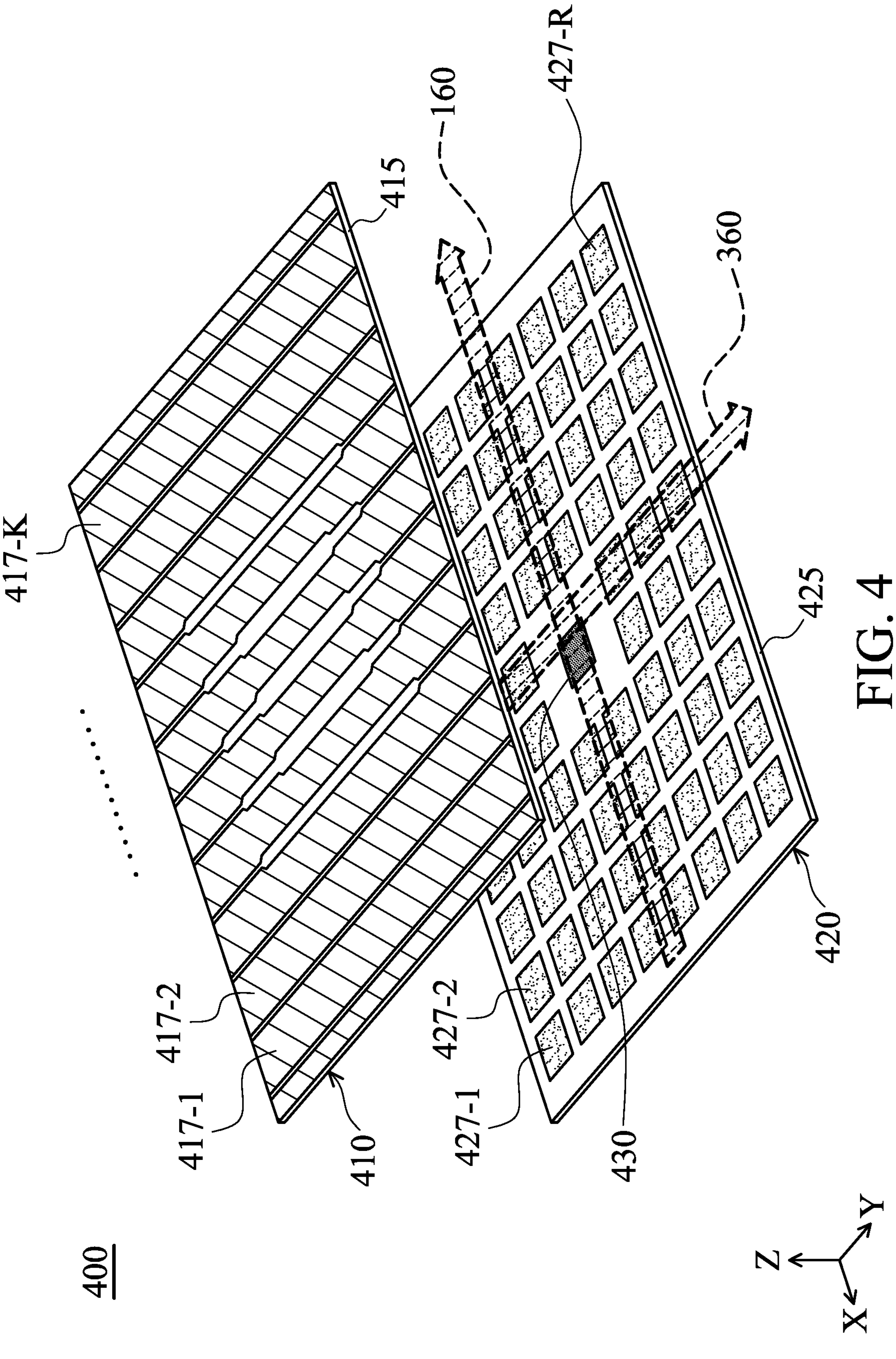
FIG. 4 is a perspective view of a communication device according to an embodiment of the invention.

FIG. 4 is a perspective view of a communication device 400 according to an embodiment of the invention. FIG. 4 is similar to FIG. 3. In the embodiment of FIG. 4, a first FSS element 410 of the communication device 400 includes a first dielectric substrate 415 and a plurality of metal strips 417-1, 417-2, . . . , and 417-K, where "K" is any positive integer greater than or equal to 2. The metal strips 417-1, 417-2, . . . , and 417-K may be disposed at intervals on the first dielectric substrate 415, so as to form a periodical structure. In some embodiments, the aforementioned periodical structure can provide a reflectivity which is greater than 50%. In alternative embodiments, the metal strips 417-1, 417-2, . . . , and 417-K have unequal widths and spacing for application in a plurality of operational frequency bands.

Furthermore, a second FSS element 420 of the communication device 400 includes a second dielectric substrate 425 and a plurality of metal units 427-1, 427-2, . . . , and 427-R, where "R" is any positive integer greater than or equal to 2. For example, each metal unit may be substantially a square metal piece, but it is not limited thereto. The metal units 427-1, 427-2, . . . , and 427-R may be disposed at intervals on a surface of the second dielectric substrate 425, so as to form another periodical structure. In some embodiments, the aforementioned periodical structure can provide a phase compensation from 30 to 180 degrees (e.g., based its lowest operational frequency). In some embodiments, the second FSS element 420 further includes a ground plane (not shown), which is disposed on the opposite surface of the second dielectric substrate 425. A feeding radiation element 430 of the communication device 400 may be implemented with a patch antenna, which may be surrounded by the metal units 427-1, 427-2, . . . , and 427-R.

In some embodiments, if a high-power operation is considered, a metal element can be replaced with a vacuum area according to Babinet's principle, without using any dielectric substrate. For example, the metal thickness of each of the first FSS element 410 and the second FSS element 420 may be greater than or equal to 1 mm, but it is not limited thereto. Furthermore, the first FSS element 410 and the second FSS element 420 can be stacked in multiple layers (e.g., more than two layers), and thus they can be used as heat sink elements. It should be noted that in a multi-layer stack design, the sizes of the aforementioned metal strips or metal units may be slightly different from those of a single-layer structure, so as to maintain the desired reflectivity or the desired phase compensation amount.

In alternative embodiments, the communication device 400 further includes more feeding radiation elements 430, so as to form an antenna array. In the communication device 400, both the first FSS element 410 and the second FSS element 420 may be substantially disposed perpendicular to the Z-axis. The transmission direction of the first electron beam 160 may be substantially parallel to the X-axis, and the transmission direction of the second electron beam 360 may be substantially parallel to the Y-axis, but they are not limited thereto. As mentioned above, both the first electron beam 160 and the second electron beam 360 are used to enhance the radiation energy of the electromagnetic signal SE (not shown), thereby increasing the radiation gain of the antenna structure of the communication device 400. Other features of the communication device 400 of FIG. 4 are similar to those of the communication device 300 of FIG. 3. Thus, the two embodiments can achieve similar levels of performance.

In other embodiments, an electron beam of a TWTA (Traveling Wave Tube Power Amplifier) is transmitted to a DLA (Dielectric Laser Accelerator), so as to further reduce the overall weight. The DLA may be integrated on a chip. In addition, the DLA and the aforementioned antenna structure can be disposed on the same carrier board.

Figure 5:
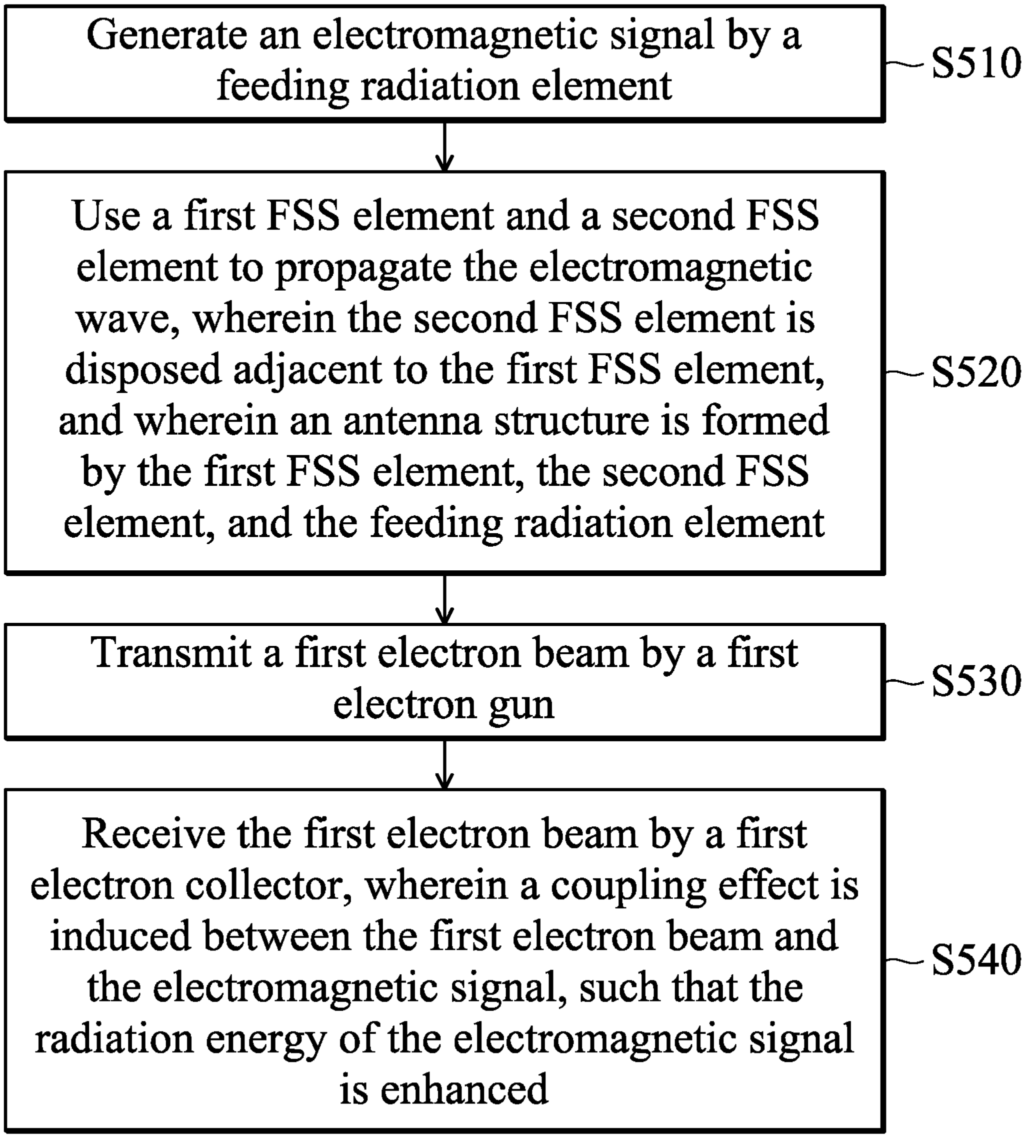
FIG. 5 is a flowchart of a communication method according to an embodiment of the invention.

FIG. 5 is a flowchart of a communication method according to an embodiment of the invention. To begin, in step S510, an electromagnetic signal is generated by a feeding radiation element. In step S520, a first FSS element and a second FSS element are used to propagate the electromagnetic wave. The second FSS element is disposed adjacent to the first FSS element. An antenna structure is formed by the first FSS element, the second FSS element, and the feeding radiation element. In step S530, a first electron beam is transmitted by a first electron gun. Finally, in step S540, the first electron beam is received by a first electron collector. A coupling effect is induced between the first electron beam and the electromagnetic signal, such that the radiation energy of the electromagnetic signal is enhanced. It should be understood that these steps are not required to be performed in order, and every feature of the embodiments of FIGS. 1 to 4 may be applied to the communication method of FIG. 5.

The invention proposes a novel communication device and a novel communication method thereof. According to practical measurements, the communication device using the above design can significantly improve its overall antenna radiation gain. Therefore, the invention is suitable for application in a variety of equipment.

Note that the above element parameters are not limitations of the invention. A designer can fine-tune these setting values according to different requirements. It should be understood that the communication device and the communication method of the invention are not limited to the configurations of FIGS. 1-5. The invention may include any one or more features of any one or more embodiments of FIGS. 1-5. In other words, not all of the features displayed in the figures should be implemented in the communication device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:
- a first FSS (Frequency Selective Surface) element;
- a second FSS element, disposed adjacent to the first FSS element;
- a feeding radiation element, generating an electromagnetic signal, wherein the electromagnetic signal is propagated by using the first FSS element and the second FSS element;
- a first electron gun, transmitting a first electron beam; and
- a first electron collector, receiving the first electron beam;
- wherein an antenna structure is formed by the first FSS element, the second FSS element, and the feeding radiation element;
- wherein a coupling effect is induced between the first electron beam and the electromagnetic signal, such that radiation energy of the electromagnetic signal is enhanced.

2. The communication device as claimed in claim 1, wherein the first FSS element is configured to partially reflect and partially transmit the electromagnetic signal.

3. The communication device as claimed in claim 1, wherein the second FSS element is configured to completely reflect the electromagnetic signal.

4. The communication device as claimed in claim 1, wherein the second FSS element is made of an AMC (Artificial Magnetic Conductor) material.

5. The communication device as claimed in claim 1, wherein the second FSS element is made of a metal material.

6. The communication device as claimed in claim 1, wherein the feeding radiation element is implemented with a patch antenna.

7. The communication device as claimed in claim 1, wherein the antenna structure covers an operational frequency band from 60 GHz to 500 GHz.

8. The communication device as claimed in claim 7, wherein a specific distance between the first FSS element and the second FSS element is substantially equal to 0.25 wavelength or 0.5 wavelength of the operational frequency band.

9. The communication device as claimed in claim 1, further comprising:
- a first multi-beam aperture board, disposed between the first electron gun and the first electron collector, wherein the first multi-beam aperture board is configured to divide the first electron beam into a plurality of first small beams.

10. The communication device as claimed in claim 9, further comprising:
- a second electron gun, transmitting a second electron beam; and
- a second electron collector, receiving the second electron beam;
- wherein another coupling effect is induced between the second electron beam and the electromagnetic signal, such that the radiation energy of the electromagnetic signal is further enhanced.

11. The communication device as claimed in claim 10, wherein a transmission direction of the second electron beam is different from that of the first electron beam.

12. The communication device as claimed in claim 10, further comprising:
- a second multi-beam aperture board, disposed between the second electron gun and the second electron collector, wherein the second multi-beam aperture board is configured to divide the second electron beam into a plurality of second small beams.

13. The communication device as claimed in claim 12, wherein each of the first multi-beam aperture board and the second multi-beam aperture board is implemented with a silicon photonic substrate.

14. A communication method, comprising the steps of:
- generating an electromagnetic signal by a feeding radiation element;
- using a first FSS (Frequency Selective Surface) element and a second FSS element to propagate the electromagnetic wave, wherein the second FSS element is disposed adjacent to the first FSS element, and wherein an antenna structure is formed by the first FSS element, the second FSS element, and the feeding radiation element;
- transmitting a first electron beam by a first electron gun; and
- receiving the first electron beam by a first electron collector, wherein a coupling effect is induced between the first electron beam and the electromagnetic signal, such that radiation energy of the electromagnetic signal is enhanced.

15. The communication method as claimed in claim 14, wherein the antenna structure covers an operational frequency band from 60 GHz to 500 GHz.

16. The communication method as claimed in claim 15, wherein a specific distance between the first FSS element and the second FSS element is substantially equal to 0.25 wavelength or 0.5 wavelength of the operational frequency band.

17. The communication method as claimed in claim 14, further comprising:
- dividing the first electron beam into a plurality of first small beams by a first multi-beam aperture board, wherein the first multi-beam aperture board is disposed between the first electron gun and the first electron collector.

18. The communication method as claimed in claim 17, further comprising:
- transmitting a second electron beam by a second electron gun; and
- receiving the second electron beam by a second electron collector, wherein another coupling effect is induced between the second electron beam and the electromagnetic signal, such that the radiation energy of the electromagnetic signal is further enhanced.

19. The communication method as claimed in claim 18, wherein a transmission direction of the second electron beam is different from that of the first electron beam.

20. The communication method as claimed in claim 18, further comprising:
- dividing the second electron beam into a plurality of second small beams by a second multi-beam aperture board, wherein the second multi-beam aperture board is disposed between the second electron gun and the second electron collector.

* * * * *